W. R. DUDLEY & L. A. GREENLEAF.
SPEEDOMETER.
APPLICATION FILED MAY 1, 1909. RENEWED JULY 2, 1913.
1,072,587.
Patented Sept. 9, 1913.
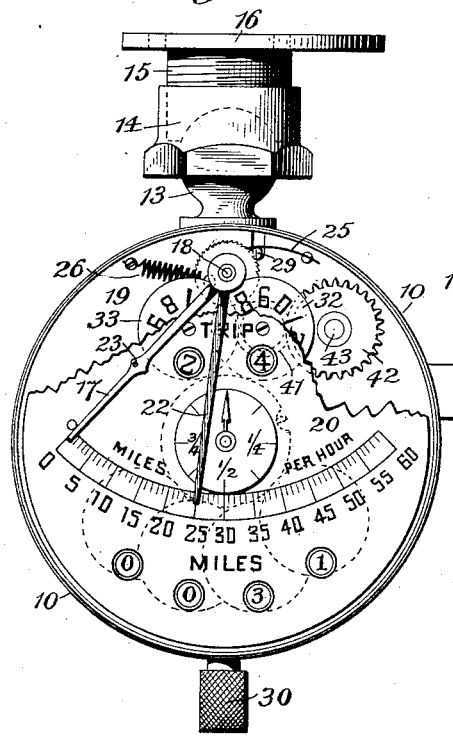
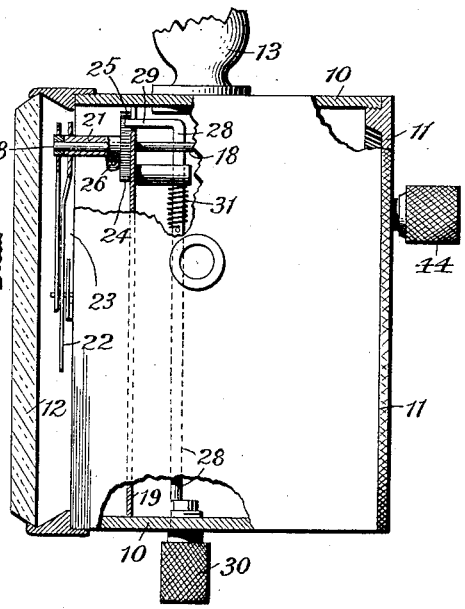
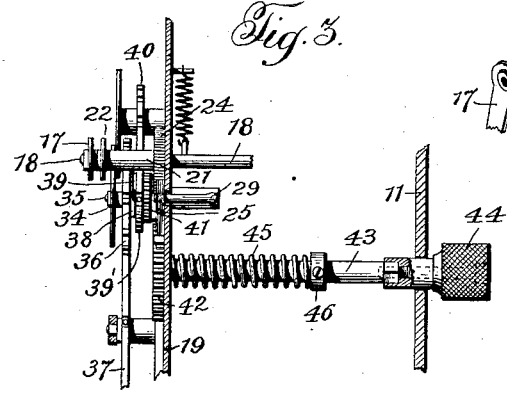
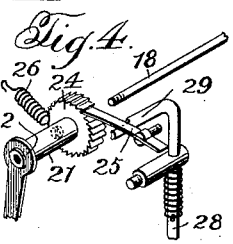
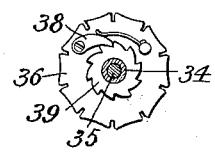
Witnesses:
Jas. E. Hutchinson
M. L. Pugh
Inventor:
Wallace R. Dudley and Louis A. Greenleaf
By Chas. J. Williamson
Attorney

UNITED STATES PATENT OFFICE.

WALLACE R. DUDLEY AND LOUIS A. GREENLEAF, OF DANVILLE, PENNSYLVANIA, ASSIGNORS TO STAR SPEEDOMETER COMPANY, A CORPORATION OF PENNSYLVANIA.

SPEEDOMETER.

1,072,587.      Specification of Letters Patent.      Patented Sept. 9, 1913.

Application filed May 1, 1909, Serial No. 493,390. Renewed July 2, 1913. Serial No. 777,098.

*To all whom it may concern:*

Be it known that we, WALLACE R. DUDLEY and LOUIS A. GREENLEAF, of Danville, in the county of Montour, and in the State of Pennsylvania, have invented a certain new and useful Improvement in Speedometers, and do hereby declare that the following is a full, clear, and exact description thereof.

The object of our invention is to improve the construction of speedometers adapted more especially for use on automobiles, but of course not limited to such use, in respect to the matter of attaching or mounting the instrument in position; a maximum speed mechanism or indicator; and a zero setting device for the trip register; and to this end our invention consists in the mechanism having the features of construction substantially as hereinafter specified and claimed.

Referring to the accompanying drawings, Figure 1 is a front elevation of a speedometer embodying our invention, a portion of the dial being broken away; Fig. 2 a section from front to rear; Fig. 3 a section in detail through the zero setting mechanism; Fig. 4 a detail view in perspective of the parts of the maximum speed mechanism. Fig. 5 a detail view of the clutch device of the zero setting mechanism.

In its general construction, our speedometer is similar to that which forms the subject of United States Patent No. 880,781, March 3, 1908, to the Star Speedometer Co.; it having a cylindrical casing 10 closed at the rear by a plate 11 that is screwed into the casing and closed at the front by a glass or bezel 12, the bezel ring being screwed upon the end of the casing. To the top of the casing on the outside is secured a ball 13 that forms one member of a universal or ball and socket joint, the socket being composed of two members or parts 14 and 15, respectively, the member 14 being internally threaded and the member 15 externally threaded, so that the two may screw together to cause their respective spherically concave surfaces to bind or press tight against the circumference of the ball, to maintain the instrument at the desired angle within the limits of movement possible from the joint with reference to the dashboard or hood of the automobile. The socket member 15 has a flange 16 at one end, provided with screw holes for the attachment of said member to the desired part of the machine or vehicle, and in some cases said flange will extend at right angles to the member, or parallel therewith, to suit the position of the surface to which the speedometer is to be attached. The attaching means or bracket which we employ, not only possesses all the flexibility or adaptability of adjustment that is required in practice, but it is very simple in construction and holds the instrument with all required firmness or rigidity.

Inasmuch as the means for moving the speed indicator hand 17 forms no part of our invention, it will not be necessary to describe the same beyond pointing out that the shaft or arbor 18 on whose outer end the hand or index 17 is fastened is suitably pivoted or journaled in the supporting plate 19, and projects to the rear of the latter where, by appropriate gearing, it is rocked or oscillated to cause the hand to travel over the speed indicating dial 20. Journaled on the shaft or arbor 18, so as to move independently of the latter, is a sleeve or hollow arbor 21 that at its outer end, just back of the speed hand 17, carries a pointer or hand 22, whose free extremity is contiguous to the speed dial 20, and said hand 22 is colored differently from the speed hand 17, being, for example, red, and it moves along with the speed hand when the latter moves from the starting point or zero, and remains at the point of highest speed to which the speed hand may be moved, and thus constitutes a maximum speed indicator. Because of such movement of the maximum speed hand, the speed hand 17 has a pin or projection 23 that extends alongside the maximum speed hand 22 on the side of the maximum speed hand required to cause its movement from zero or the starting point. On its rear or inner end, the maximum speed hand carrying sleeve or arbor has a flange that has fine teeth 24 cut in its periphery so that it forms a ratchet wheel, which is engaged by a spring pawl 25 to hold the maximum speed hand at the point to which it may be moved by the speed hand 17.

A spring 26 attached at one end to the ratchet wheel 24 of the maximum speed hand arbor acts to move the maximum speed hand to zero when the pawl is disengaged from the teeth of the ratchet wheel, and to enable this disengagement of the pawl at will when it is desired to restore the maximum speed hand to zero, a pawl-releasing device is provided that comprises a slidable rod 28 supported at the rear of the plate 19, and having one end extended through a slot in said plate, so that it constitutes a finger 29 projecting beneath the pawl and adapted by the longitudinal movement of the rod to engage the pawl and lift it out of engagement with the teeth of the ratchet wheel. At its other end, said rod is contiguous to the end of a push button 30, that extends through the casing 10, so as to lie within and outside the same, and said rod is moved to and yieldingly held in the position from which it is moved by said push button by a coil spring 31.

The trip register comprises a units wheel or dial 32, and a tens wheel or dial 33. The units dial is fixed on the outer end of a hollow arbor 34 journaled on a stud or post 35, projecting from the supporting plate 19. Loose on the hollow arbor 34 is a gear wheel 36 of the Geneva stop type, which is revolved through only one-tenth of a revolution by the one tooth wheel 37 forming a part of the driving mechanism, and on its inner or under side said gear 36 has a pawl 38 which coacts with a ratchet wheel 39 fixed to the arbor so that when the gear 36 is turned in a forward direction, the arbor 34, through the pawl and ratchet, will be clutched to it and the two will rotate together, said clutch connection permitting the independent revolution of the hollow arbor, as when it is desired to turn the trip register back to zero. Contiguous to the ratchet wheel, and also fixed upon the arbor, is a one tooth wheel or disk 39', which meshes with a gear wheel 40 fixed to the arbor of the tens wheel of the trip register, to transmit movement to the latter, either a forward movement in registering, or a backward movement in setting to zero. On the units wheel arbor 34, on the end contiguous to the supporting plate 19, is a pinion 41 into and out of engagement with which a gear wheel 42 by an endwise or longitudinal movement of its arbor 43 may be moved, and said arbor has attached to it a turning knob or head 44 on the outside of the back plate 11, of the casing, so that when by the endwise movement of the arbor, produced by pressure applied to said turning knob or head, the gear wheel 42 is moved into mesh with the pinion 41, the dials of the trip register may be turned back to zero. Normally, said gear wheel is yieldingly held in a position out of mesh with said pinion, by means of a coil spring 45 interposed between a collar 46 on the arbor and the supporting plate 19. The turning head or knob 44 is detachably connected with the arbor to enable the application and removal of the back plate 11 of the casing.

Having thus described our invention, what we claim is—

1. The combination of a casing, registering mechanism comprising a rotatable indicator, an arbor to which said indicator is fixed, a driving wheel loose on the arbor, means for rotating the driving wheel in a forward direction, means for clutching the driving wheel and the arbor to cause them to rotate together in a forward direction while permitting independent movement of the rotatable indicator for zero setting, and normally inactive means independent of the driving wheel moving means for moving the indicator in the direction to set the same to zero, including an operating knob accessible on the exterior of the casing.

2. The combination of a casing, a dial wheel, an arbor to which the same is fixed, said arbor being hollow, a stud in the arbor, a driving wheel loose on the arbor, means consisting of a pawl on the wheel and a ratchet wheel fixed to the arbor for clutching the driving wheel and the arbor to cause them to rotate together in one direction, while permitting independent movement of the dial wheel, a pinion on said arbor, a gear wheel, and means for moving said gear wheel into and out of mesh with the pinion, consisting of a longitudinally movable shaft having a knob on the outside of the casing.

In testimony that we claim the foregoing we have hereunto set our hands.

WALLACE R. DUDLEY.
LOUIS A. GREENLEAF.

Witnesses:
  WILLIAM V. OGLESBY,
  THOS. G. VINCENT.

Copies of this patent may be obtained for five cents each, by addressing the "Commissioner of Patents, Washington, D. C."